(12) United States Patent
Wang et al.

(10) Patent No.: US 11,748,565 B2
(45) Date of Patent: Sep. 5, 2023

(54) METHOD FOR ANALYZING FINE-GRAINED TEXT SENTIMENT BASED ON USERS' HARSHNESS

(71) Applicant: ZHEJIANG GONGSHANG UNIVERSITY, Zhejiang (CN)

(72) Inventors: Xun Wang, Hangzhou (CN); Yili Fang, Hangzhou (CN); Ting Zhou, Hangzhou (CN)

(73) Assignee: ZHEJIANG GONGSHANG UNIVERSITY, Hangzhou (CN)

(*) Notice: Subject to any disclaimer, the term of this patent is extended or adjusted under 35 U.S.C. 154(b) by 0 days.

(21) Appl. No.: 18/074,540

(22) Filed: Dec. 5, 2022

(65) Prior Publication Data

US 2023/0100687 A1   Mar. 30, 2023

Related U.S. Application Data

(63) Continuation of application No. PCT/CN2020/127655, filed on Nov. 10, 2020.

(30) Foreign Application Priority Data

Jun. 5, 2020 (CN) .......................... 202010504181.7

(51) Int. Cl.
*G06F 40/279* (2020.01)
(52) U.S. Cl.
CPC ................... *G06F 40/279* (2020.01)
(58) Field of Classification Search
CPC ...... G06F 40/279; G06F 40/30; G06F 40/211; G06F 16/35; G06F 40/284
USPC .......................................................... 704/9
See application file for complete search history.

(56) References Cited

U.S. PATENT DOCUMENTS

2015/0046371 A1   2/2015   Leary

FOREIGN PATENT DOCUMENTS

| CN | 107808008 A | 3/2018 |
| CN | 109299256 A | 2/2019 |
| CN | 110413780 A | 11/2019 |
| CN | 110555210 A | 12/2019 |
| CN | 110706028 A | 1/2020 |

OTHER PUBLICATIONS

International Search Report (PCT/CN2020/127655); dated Feb. 25, 2021.
User—Sentiment—Model—Oriented—to—Product—Attribute.

*Primary Examiner* — Thierry L Pham
(74) *Attorney, Agent, or Firm* — W&G Law Group

(57) ABSTRACT

Disclosed is a method for performing fine-grained text sentiment analysis based on the users' harshness. According to the method, product attributes are automatically extracted according to comments in a data set, and the comments are split according to the product attributes, so as to achieve the effect of fine-grained analysis. Then, an inference model, which takes users' harshness into consideration, is used, and the inference model takes the users' harshness as hidden variables and solves same by means of an expectation-maximization (EM) algorithm, so as to obtain evaluation results of several product attributes of each product, thereby further improving the accuracy of sentiment analysis. According to the method, the problems in sentiment analysis of analysis granularity being too large and the users' harshness differing are solved, such that high-quality sentiment analysis can be performed on product comments.

7 Claims, 3 Drawing Sheets

METHOD FOR ANALYZING FINE-GRAINED TEXT SENTIMENT BASED ON USERS' HARSHNESS

CROSS-REFERENCE TO RELATED APPLICATIONS

The present application is a continuation of International Application No. PCT/CN2020/127655, filed on Nov. 10, 2020, which claims priority to Chinese Application No. 202010504181.7 filed on Jun. 5, 2020, the contents of which are incorporated herein by reference in their entireties.

TECHNICAL FIELD

The present disclosure belongs to the technical field of natural language processing in product comment analysis, and particularly relates to a method for analyzing fine-grained text sentiment based on the users' harshness.

BACKGROUND

Sentiment analysis is a process of analyzing, processing, summarizing and reasoning subjective texts with sentimental color. In recent years, with the rapid development of online commercial websites such as Taobao, JD.COM, Douban, etc., sentiment analysis has attracted wide attention of researchers, as well as people from industry. Sentiment analysis of product comments can not only help consumers to select effective information, but also help manufacturers improve their products.

Online product comments are mostly document-level, usually including evaluations of various product attributes. However, traditional sentiment analysis methods analyze product comments as a whole, ignoring product attributes, thus failed to evaluate products accurately. Therefore, fine-grained sentiment analysis of product comments is necessary. At present, researchers have done a lot of research on this field by giving product attributes in advance or extracting product attributes from comments. Wang Yequan et al. proposed a model ATAE based on LSTM in 2016, and Xue Wei et al. proposed a model GCAE based on CNN in 2018.

However, at the same time, there are still some problems in sentiment analysis, such as different users' harshness. That is to say, different users have different evaluation criteria for the same product due to the influence of culture, life experience and other factors. For example, some users tend to give good comments to all products, while others tend to give bad comments to all products. If this factor is not taken into account, it is difficult to get high-quality sentiment analysis results about product comments. Therefore, it is of great significance to study a sentiment analysis method considering the users' harshness.

SUMMARY

In considering of the problems that the analysis granularity is too large and the users' harshness are different in the sentiment analysis process of product comments, the present disclosure provides a method for analyzing fine-grained text sentiment based on the users' harshness, which could further improves the sentiment analysis accuracy in product comments.

The purpose of the present disclosure is realized through the following technical solution: a method for analyzing fine-grained text sentiment based on the users' harshness, This method mainly consists of the following steps:

(1) Collect a large number of users' comments from online commercial websites, such as Tao,JD.com, etc
(2) Extract relevant information such as users, products, comments and the likes from the user comments separately to build a data set;
(3) Extract product attribute words from the users' comments, aggregating all product attribute to obtain a number of product attributes. Then the comments are split into attribute statement vectors;
(4) Pre-train an SVM model by using the attribute statement vectors and corresponding sentiment labels, and then put the attribute statement vectors in step (3) into the SVM model for testing to determine sentiments contained the comments itself; and
(5) Combine the user information and product information obtained in step (2) and the sentiment of the product comments obtained in step (4) into an inference model that considers the users' harshness to obtain the evaluation of several product attributes of each product; wherein, the inference model takes the users' harshness as hidden variables, and solves the problem by expectation-maximization (EM) algorithm.

More specifically, the step (3) includes the following steps:

(3-1) Extract candidate product attribute words from the users' comments, and screening final product attribute words;
(3-2) Aggregate all product attribute words by mean shift clustering to obtain a number of product attributes; and
(3-3) Split the comment of products into attribute statement vectors according to the product attributes.

The step (3-1) could be further into the following steps:

(a) Firstly, use the NLTK (Natural Language Processing Toolkit) to remove stop words from the comment, and then use the StanfordCoreNLP Natural Language Processing Toolkit to split words and mark the part of speech of the words;
(b) Screen nouns with a close word distance before and after all adjectives, and save the nouns as candidate attribute words; and
(c) Count the word frequencies of all candidate attribute words, deleting the words below a threshold, and then manually filter out final product attribute words based on domain relevance.

The step (3-2) could be further divided into the following steps:

(a) Pre-train a word2vec model based on the data set;
(b) Obtain the word vectors of all product attribute words by the pre-trained word2vec model, and use the t-SNE algorithm for dimension reduction;
(c) Aggregate all product attribute words by means of the mean shift clustering; and
(d) Obtain optimal parameters by calculating a silhouette coefficient, and finally obtain a plurality of product attributes, wherein each product attribute contains a plurality of product attribute words, and the number of the product attributes is satisfied so as to maximize the silhouette coefficient.

The step (3-3) could be further divided into the following steps:

(a) Use the StanfordCoreNLP Natural Language Processing Toolkit to split the comment and marking the part of speech of the words;
(b) Extract all the nouns in a sentence and removing product names;

(c) Pre-train the TF-IDF model based on the data set, delete nouns with too low TF-IDF values or too high word frequencies;

(d) Calculate the L2 distances between the nouns screened in the sentence and the attribute words in several product attributes based on the pre-trained Word2Vec model, and select a product attribute with the shortest distance sum as the product attribute corresponding to the sentence;

(e) Merge sentences with the same product attribute, so as to divide a general comment statement into vectors containing several product attribute statements.

Further, the calculation method in the step (d) of the step (3-3) is as follows: firstly, calculate a sum $A_{ij}$ of L2 distances between a certain noun i and all attribute words in a certain product attribute j, and then add the distances $A_{ij}$ of all nouns corresponding to a certain product attribute j to obtain a distance value $A_j$ corresponding to each product attribute j, and taking the product attribute with the shortest $A_j$ as the product attribute corresponding to the sentence.

The step (5) could be further divided into the following steps:

(a) Obtain the sentiment probability corresponding to a user id, a product id and an attribute statement vector of each comment; wherein the sentiment probability $P_{ij}^t$ corresponding to each attribute statement is:

$$P_{ij}^t = (P_{good}, P_{medium}, P_{poor})$$

where i is the user id, j is the product id, and t is the product attribute, $P_{good} + P_{medium} + P_{poor} = 1$.

(b) Calculate a confusion matrix R, $R(x_s, x_y)$ indicates a probability that an attribute statement evaluation $s_{ij}^t$ is $x_s$ when an objective product attribute evaluation $y_j^t$ is $x_y$:

$$R(x_s, x_y) = \begin{cases} P_{ij}^{t x_s} & x_s = x_y \\ \frac{1 - P_{ij}^{t x_s}}{2} & x_s \neq x_y \end{cases}$$

where $x_y$, $x_s \in$ (good, medium, poor);

(c) Calculate an E step in the EM algorithm: calculating a conditional probability of the objective product attribute evaluation $y_j^t$:

$$p(s_{ij}^t \mid y_j^t, \mu_i, \tau_j^t, R) = \begin{cases} \frac{1}{1+e^{-\mu_i \tau_j^t}} R(s_{ij}^t, y_j^t) & s_{ij}^t = y_j^t \\ \frac{\frac{1}{1+e^{-\mu_i \tau_j^t}} R(s_{ij}^t, y_j^t)}{T-1} & s_{ij}^t \neq y_j^t \end{cases}$$

$$p(y_j^t \mid S, \mu, \tau, R) = p(y_j^t \mid s_j^t, \mu, \tau_j^t, R) \propto$$

$$p(y_j^t \mid \mu, \tau_j^t) p(s_j^t \mid y_j^t, \mu, \tau_j^t, R) \propto p(y_j^t) \prod_i p(s_{ij}^t \mid y_j^t, \mu_i, \tau_j^t, R)$$

where $p(s_{ij}^t \mid y_j^t, \mu_i, \tau_j^t, R)$ represents the conditional probability that the attribute statement evaluation is $s_{ij}^t$ when the objective evaluation of product attribute $y_j^t$, users' harshness parameter $\mu_i$, a product evaluation difficulty $\tau_j^t$ and the confusion matrix R are given; $p(y_j^t \mid S, \mu, \tau, R)$ indicates the conditional probability of the objective product attribute evaluation $y_j^t$ when an attribute statement evaluation set S, the users' harshness parameters $\mu$, the product evaluation difficulty $\tau$ and the confusion matrix R are given; T is the number of possible results for product evaluation;

(d) Calculate an M step in the EM algorithm: solving the users' harshness $\mu$ and the product evaluation difficulty $\tau$ for maximizing a Q function:

$$Q(\mu, \tau, R) = E[\ln p(S, Y \mid \mu, \tau, R)]$$
$$= E\left[\ln \prod_{jt} \left(p(y_j^t) \prod_i p(s_{ij}^t \mid y_j^t, \mu_i, \tau_j^t, R)\right)\right]$$
$$= \sum_{jt} E[\ln p(y_j^t)] + \sum_{ijt} E[\ln p(s_{ij}^t \mid y_j^t, \mu_i, \tau_j^t, R)]$$

where Y is an objective product attribute evaluation set, and S is an attribute statement evaluation set;

(e) Optimize the Q function by the SLSQP gradient descent optimization algorithm, and stop when the maximum number of cycles is reached or a difference between the Q functions of two adjacent iterations is less than a threshold value, so as to obtain the users' harshness $\mu$, the product evaluation difficulty $\tau$ and the result Y of the product attribute evaluation set.

Compared with the previous method, the present method has the beneficial technical effects that the product attributes are automatically extracted according to the comments in the data set, and the comments are segmented according to the product attributes, so as to achieve the effect of fine-grained analysis; and then, an inference model considering the users' harshness is adopted, so that the accuracy of sentiment analysis is further improved.

DESCRIPTION OF EMBODIMENTS

In order to make the above objects, features and advantages of the present disclosure more obvious and understandable, the specific embodiments of the present disclosure will be described below in detail with reference to the accompanying drawings.

In the following description, many specific details are set forth in order to fully understand the present disclosure, but the present disclosure can be implemented in other ways different from those described here, and those skilled in the art can make similar promotion without violating the connotation of the present disclosure. Therefore, the present disclosure is not limited by the specific embodiments disclosed below.

Figure 1:
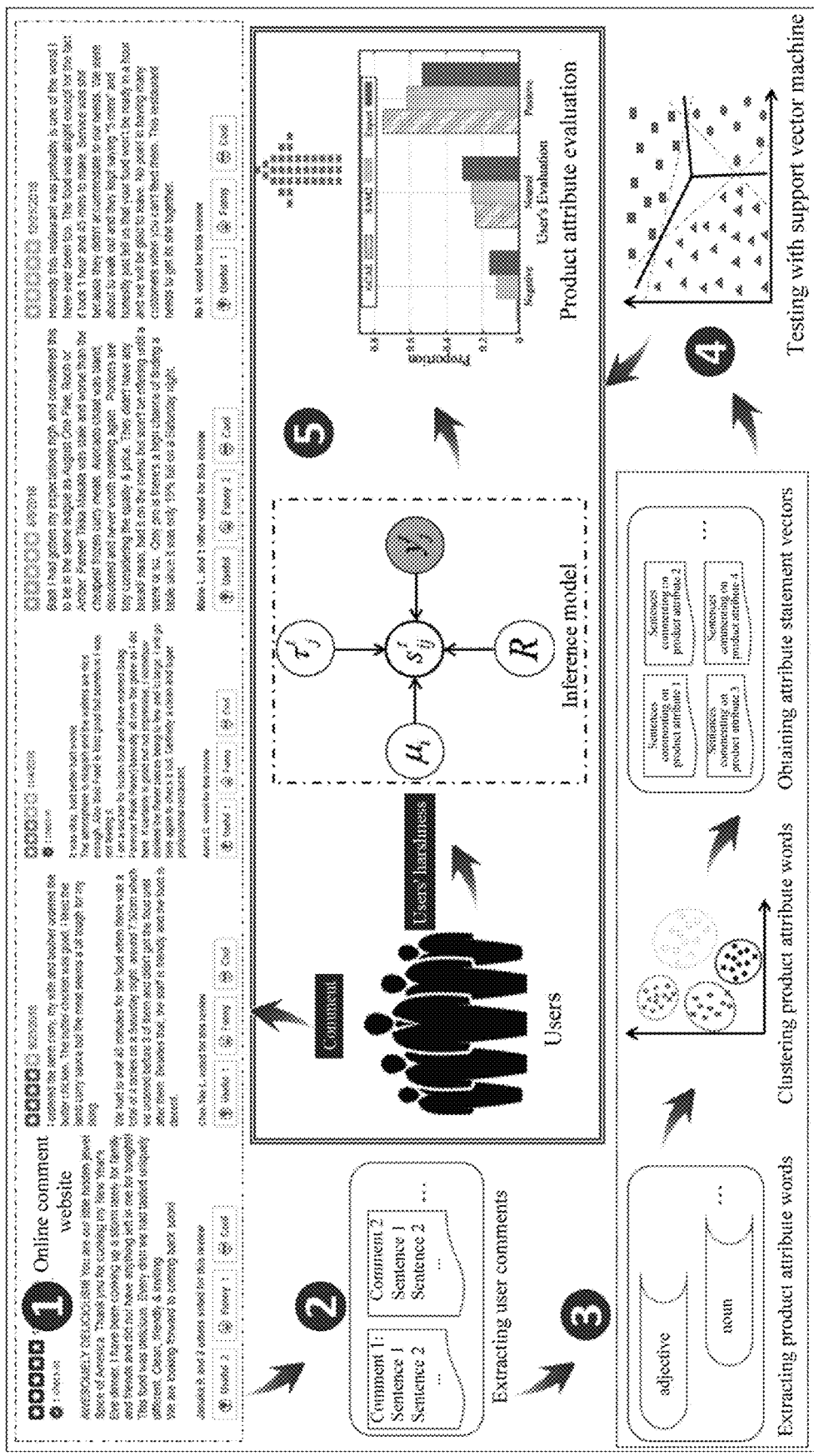
FIG. 1 is a frame diagram of a method for analyzing fine-grained text sentiment based on the users' harshness of the present disclosure.

As shown in FIG. 1, this application proposes a method for analyzing fine-grained text sentiment based on the users' harshness. Firstly, product comments are split according to product attributes to achieve fine-grained analysis, and then the users' harshness is taken into account to improve the accuracy of text sentiment analysis. The method specifically includes the following steps:

(1) Collect a large number of users' comments from online commercial websites such as Amazon and Taobao;

(2) Extract relevant information such as users, products, comment and the likes from the users' comments to form a data set;

(3) Extract product attribute words from the comment statements, aggregating all product attribute words to obtain a number of product attributes, and split the users' comment of products according to the product attributes to obtain attribute statement vectors;

(4) Pre-train the Support Vector Machine (SVM) model by using the product comment statements and corresponding sentiment labels, and then put the attribute statement vectors in step (3) into the SVM model to obtain a sentiment probability of an attribute statement per se; and (5) Put the user and product information obtained in step (2) and the sentiment probability of the attribute statement obtained in step (4) into the inference model considering the users' harshness to obtain evaluation results of several product attributes of each product; wherein, the inference model takes the user's harshness as hidden variables, and solves the same by means of an expectation-maximization (EM) algorithm.

More specifically, the step (3) includes the following steps:

(3-1) Extract candidate product attributes from the comment statements, and screen final product attributes;

(3-2) Aggregate all product attributes by means of a mean shift clustering method to obtain a number of product attributes, wherein four product attributes are obtained in this embodiment; and (3-3) Divid the comment statements of products into attribute statement vectors according to the product attributes.

The step (3-1) could be further divided into the following steps:

(a) Use NLTK (Natural Language Processing Toolkit) to remove stop words from the comment statements, and use StanfordCoreNLP Natural Language Processing Toolkit to segment words and mark the part of speech of the words;

(b) Filter nouns with a close word distance before and after all adjectives, and saving the nouns as candidate attribute words, wherein usually, nouns with a distance of 3-5 words are selected, and in this embodiment, nouns with a distance of 5 words before and after all adjectives are selected; and (c) Count the word frequencies of all candidate attribute words, deleting the words below a threshold, and then manually filter out final product attribute words based on domain relevance.

Further, step (3-2) includes the following steps:

(a) Pre-train a word2vec model based on the data set;

(b) Obtain the word vectors of all product attributes by the pre-trained word2vec model, and use the t-SNE algorithm for dimension reduction;

(c) Aggregate all product attributes by the mean shift clustering; and (d) Obtain optimal parameters by calculating a silhouette coefficient, and finally obtaining a plurality of product attributes, wherein each product attribute contains a plurality of product attribute words, and the number of the product attributes is satisfied so as to maximize the silhouette coefficient; four product attributes are obtained in this embodiment.

The step (3-3) could be divided into the following steps:

(a) Use StanfordCoreNLP Natural Language Processing Toolkit to split the comment statements and marking the part of speech of the words;

(b) Extract all the nouns in a sentence and removing product names;

(c) Pre-train TF-IDF model based on the data set, and delete nouns with too low TF-IDF values or too high word frequencies;

(d) Calculate L2 distances between the nouns screened in the sentence and the attribute words in four product attributes based on the pre-trained Word2Vec model, and selecting a product attribute with the shortest distance sum as the product attribute corresponding to the sentence as follows.

Firstly, calculate a sum $A_{ij}$ of L2 distances between a certain noun i and all attribute words in a certain product attribute j, and then further adding the distances $A_{ij}$ of all nouns corresponding to a certain product attribute j to obtain a distance value $A_j$ corresponding to each product attribute j, and taking the product attribute with the shortest $A_j$ as the product attribute corresponding to the sentence.

(e) Merge sentences with the same product attribute, so as to divide a general comment statement into vectors containing four attribute statements.

More specifically, step (5) includes the following steps:

(a) Obtain the sentiment probability corresponding to a user id, a product id and an attribute statement vector of each comment; wherein the sentiment probability $P_{ij}^t$ corresponding to each attribute statement is:

$$P_{ij}^t = (P_{good}, P_{medium}, P_{poor})$$

where i is the user id, j is the product id, and t is the product attribute, $P_{good} + P_{medium} + P_{poor} = 1$.

(b) Calculate a confusion matrix R, $R(x_s, x_y)$ indicates a probability that an attribute statement evaluations is $x_s$ when an objective product attribute evaluation $y_j^t$ is $x_y$:

$$R(x_s, x_y) = \begin{cases} P_{ij}^{t,x_s} & x_s = x_y \\ \dfrac{1 - P_{ii}^{t,x_s}}{2} & x_s \neq x_y \end{cases}$$

where $x_y, x_s \in$ (good, medium, poor);

(c) Calculate the E step in the EM algorithm: calculate a conditional probability of the objective product attribute evaluation $y_j^t$:

$$p(s_{ij}^t \mid y_j^t, \mu_i, \tau_j^t, R) = \begin{cases} \dfrac{1}{1+e^{-\mu_i \tau_j^t}} R(s_{ij}^t, y_j^t) s_{ij}^t = y_j^t \\ \dfrac{\dfrac{1}{1+e^{-\mu_i \tau_j^t}} R(s_{ij}^t, y_j^t)}{T-1} s_{ij}^t \neq y_j^t \end{cases}$$

$$p(y_j^t \mid S, \mu, \tau, R) = p(y_j^t \mid s_j^t, \mu, \tau_j^t, R) \propto$$

$$p(y_j^t \mid \mu, \tau_j^t) p(s_j^t \mid y_j^t, \mu, \tau_j^t, R) \propto p(y_j^t) \prod_i p(s_{ij}^t \mid y_j^t, \mu_i, \tau_j^t, R)$$

where $p(s_{ij}^t \mid y_j^t, \mu_i, \tau_j^t, R)$ represents the conditional probability that the attribute statement evaluation is $s_{ij}^t$ when the objective product attribute evaluation $y_j^t$, users' harshness $\mu_i$, product evaluation difficulty $\tau_j^t$ and the confusion matrix R are given; $p(y_j^t \mid S, \mu, \tau, R)$ indicates the conditional probability of the objective product attribute evaluation $y_j^t$ when an attribute statement evaluation set S, users' harshness μ, the product evaluation difficulty τ and the confusion matrix R are given; T is the number of possible results for product evaluation;

The method uses the parameter $1/\tau_j^t \in [0, \infty)$ to model the evaluation difficulty $\tau_j^t$ of the product attributes, wherein $\tau_j^t$ is constrained to be positive; $1/\tau_j^t=\infty$ here means that product attribute evaluation is very difficult, that is, product attributes are similar to most product attributes, or a lot of background knowledge and relevant abilities are needed to evaluate; even for a relatively professional expert, there is only 33.33% chance of correct evaluation; $1/\tau_j^t=0$ means it is easy to evaluate product attributes; the larger $1/\tau_j^t$, the more difficult it is for users to evaluate product attributes;

In addition, the harshness of each user is modeled by the parameter $\mu_i \in (-\infty, +\infty)$; $\mu_i=+\infty$ means that user always gives the same evaluation as most people; $\mu_i=-\infty$ means that the user always gives a different evaluation from most people, and his/her standard is particularly different from that of ordinary people; finally, $\mu_i=0$ means that the user knows nothing about this product, that is, his/her evaluation does not carry information about the objective evaluation, but gives the evaluation randomly;

(d) Calculate the M step in the EM algorithm: infer users' harshness μ and the product evaluation difficulty τ for maximizing a Q function:

$$Q(\mu, \tau, R) = E[\ln p(S, Y | \mu, \tau, R)]$$
$$= E\left[\ln \prod_{jt} \left(p(y_j^t)\right) \prod p(s_{ij}^t | y_j^t, \mu_i, \tau_j^t, R)\right]$$
$$= \sum_{jt} E[\ln p(y_j^t)] + \sum_{kjt} E[\ln p(s_{ij}^t | y_j^t, \mu_i, \tau_j^t, R)]$$

where Y is an objective product attribute evaluation set, and S is an attribute statement evaluation set;

(e) Optimize the Q function by the SLSQP gradient descent optimization algorithm, and stopping when the maximum number of cycles is reached or a difference between the Q functions of two adjacent iterations is less than a threshold value, so as to obtain the users' harshness μ, the product evaluation difficulty τ and the result Y of the product attribute evaluation set.

Figure 2:
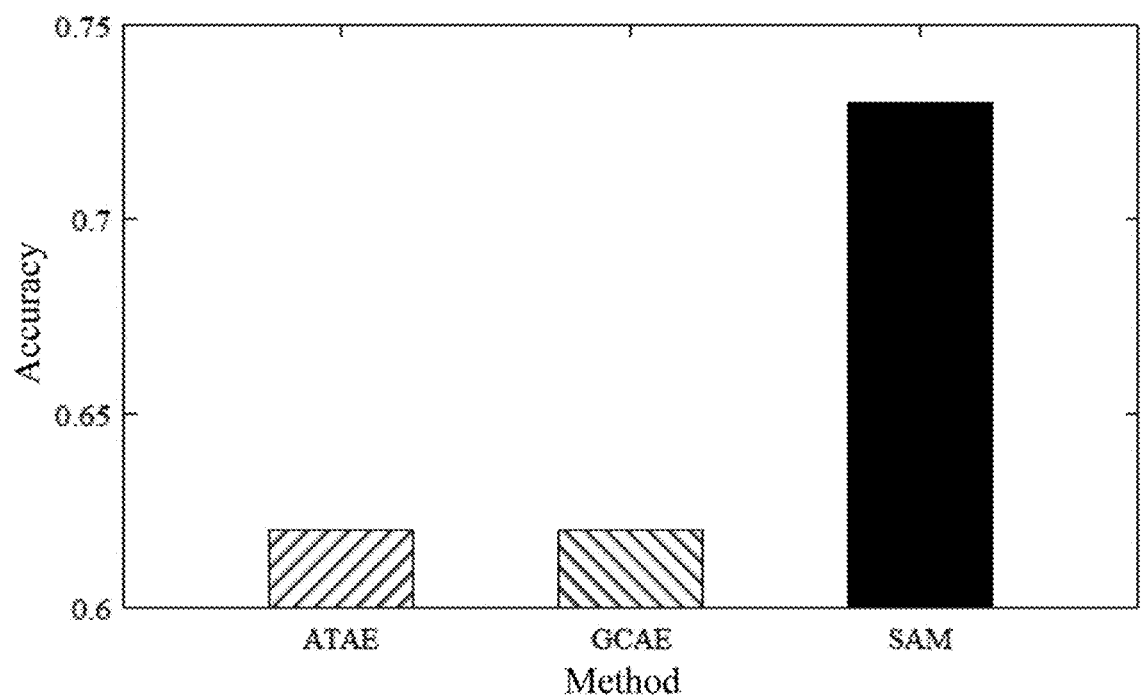
FIG. 2 is a comparison chart of the accuracy of results between the present disclosure and the other two methods.
Figure 3:
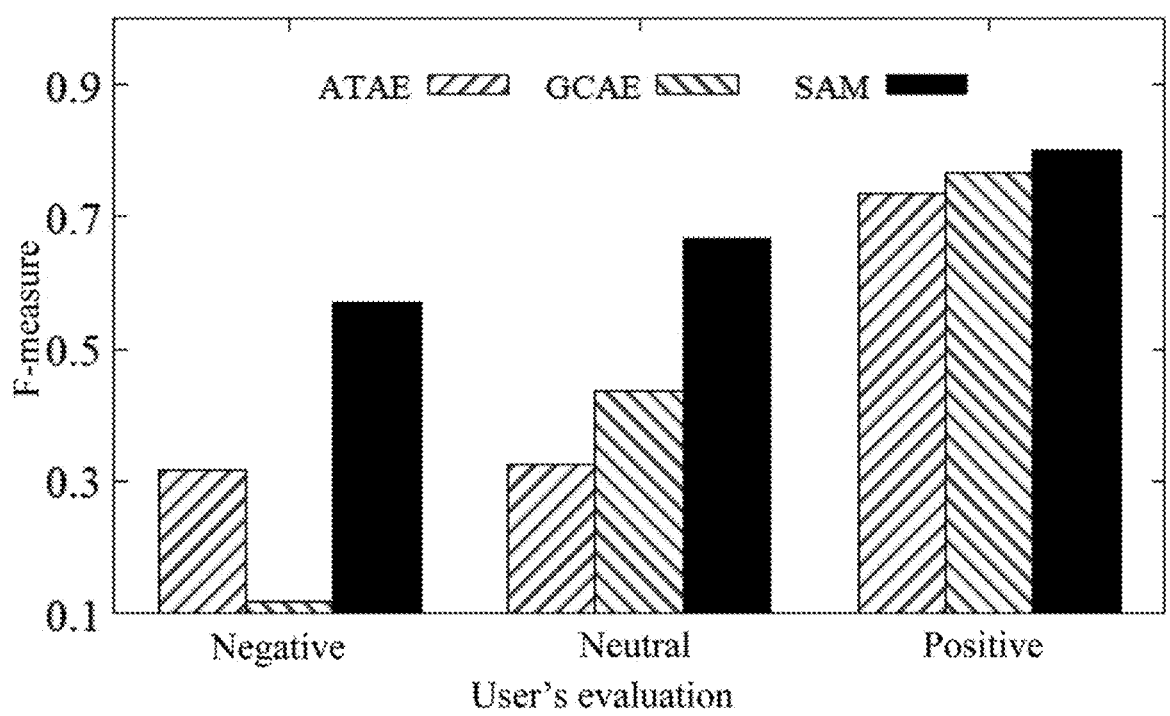
FIG. 3 is a comparison diagram of F values in the results between the present disclosure and the other two methods.

The applicant conducted an experiment on the movie data set collected by the Internet Movie Database (IMDB) online comment website. At the same time, Accuracy, F-Measure, Kappa coefficient and Kendall correlation coefficient are used to measure the experimental results, which were compared with ATAE model and GCAE model. The final results are shown in the following table 1, FIG. 2 and FIG. 3 (in FIG. 2 and FIG. 3, SAM represents the method of the present disclosure):

TABLE 1

Results of sentiment analysis

| Method | Kappa | Kendall |
|---|---|---|
| ATAE | 23.12% | 31.12% |
| GCAE | 27.83% | 43.16% |
| Result of the method of the present disclosure | 52.76% | 50.66% |

The steps of the method or algorithm described combined with the embodiments of the present disclosure may be implemented in a hardware manner, or may be implemented in a manner in which a processor executes software instructions. The software instructions may consist of corresponding software modules, and the software modules can be stored in Random Access Memory (RAM), flash memory, Read Only Memory (ROM), Erasable Programmable ROM (EPROM), Electrically Erasable Programmable Read-Only Memory (EEPROM), registers, hard disks, removable hard disks, CD-ROMs or any other forms of storage media well-known in the art. An exemplary storage medium is coupled to the processor, such that the processor can read information from, and write information to, the storage medium. The storage medium can also be an integral part of the processor. The processor and storage medium may reside in an Application Specific Integrated Circuit (ASIC). Alternatively, the ASIC may be located in a node device, such as the processing node described above. In addition, the processor and storage medium may also exist in the node device as discrete components.

It should be noted that when the data compression apparatus provided in the foregoing embodiment performs data compression, division into the foregoing functional modules is used only as an example for description. In an actual application, the foregoing functions can be allocated to and implemented by different functional modules based on a requirement, that is, an inner structure of the apparatus is divided into different functional modules, to implement all or some of the functions described above. For details about a specific implementation process, refer to the method embodiment. Details are not described herein again.

All or some of the foregoing embodiments may be implemented by using software, hardware, firmware, or any combination thereof. When the software is used for implementation, all or some of the embodiments may be implemented in a form of a computer program product. The computer program product includes one or more computer instructions. When the computer program instructions are loaded and executed on a server or a terminal, all or some of the procedures or functions according to the embodiments of this application are generated. The computer instructions may be stored in a computer-readable storage medium or may be transmitted from a computer-readable storage medium to another computer-readable storage medium. For example, the computer instructions may be transmitted from a web site, computer, server, or data center to another web site, computer, server, or data center in a wired (for example, a coaxial optical cable, an optical fiber, or a digital subscriber line) or wireless (for example, infrared, radio, or microwave) manner. The computer-readable storage medium may be any usable medium accessible by a server or a terminal, or a data storage device, such as a server or a data center, integrating one or more usable media. The usable medium may be a magnetic medium (for example, a floppy disk, a hard disk, or a magnetic tape), an optical medium (for example, a digital video disk (DVD)), or a semiconductor medium (for example, a solid-state drive).

The above is only the preferred embodiment of the present disclosure. Although the present disclosure has been disclosed in the preferred embodiment, it is not intended to limit the present disclosure. Anyone who is familiar with the art can make many possible changes and modifications to the technical solution of the present disclosure by using the above disclosed methods and technical contents without departing from the scope of the technical scheme of the present disclosure, or modify them into equivalent embodiments with equivalent changes. Therefore, any simple modifications, equivalent changes and modifications made to the above embodiments according to the technical essence of the present disclosure without departing from the content of the technical scheme of the present disclosure shall fall within the scope of protection of the technical scheme of the present disclosure.

What is claimed is:

1. A method for analyzing fine-grained text sentiment based on a users' harshness, comprising:
   step (1): collecting comments from online commercial websites;
   step (2): extracting relevant information comprising a user, a product, comment statement from the comments to form a data set;
   step (3): extracting a product attribute word from the comment statement, aggregating all product attribute words to obtain product attributes, and segmenting the comment statement of the product according to the product attributes to obtain an attribute statement vector;
   step (4): pre-training the SVM model by using the comment statement of the product and a sentiment label corresponding to the comment statement, and then putting the attribute statement vector obtained in the step (3) into the SVM model for testing to obtain a sentiment probability of an attribute statement; and
   step (5) combining information of the user and the product obtained in the step (2) and the sentiment probability of the attribute statement obtained in the step (4) into an inference model considering users' harshness to obtain evaluation results of product attributes of each product; wherein the users' harshness is taken as a hidden variable in the inference model, and is solved by an expectation-maximization (EM) algorithm.

2. The method according to claim 1, wherein the step (3) comprises:
   step (3-1): extracting a candidate product attribute word from the user's comment statement, and screening a final product attribute word;
   step (3-2): aggregating all product attribute words by mean shift clustering to obtain product attributes; and
   step (3-3): splitting the comment of the product into the attribute statement vector according to the product attributes.

3. The method according to claim 2, wherein the step (3-1) comprises:
   step (3-1a): removing a stop word from the comment statement by the NLTK (Natural Language Processing Toolkit), and then segmenting words and marking a part of speech of the words by the StanfordCoreNLP Natural Language Processing Toolkit;
   step (3-1b): screening a noun with a word distance proximate to all adjectives, and saving the noun as candidate attribute words; and
   step (3-1c): counting word frequencies of all candidate attribute words, deleting words below a threshold, and then manually filter out the final product attribute word based on domain relevance.

4. The method according to claim 2, wherein the step (3-2) comprises:
   step (3-2a): pre-training a word2vec model based on the data set;
   step (3-2b): obtaining word vectors of all product attributes by the pre-trained word2vec model, and reducing dimension by the t-SNE algorithm;
   step (3-2c): aggregating all product attribute words by means of the mean shift clustering method; and
   step (3-2d): obtaining an optimal parameter by calculating a silhouette coefficient, and finally obtaining product attributes, wherein each product attribute comprises product attribute words, and a number of the product attributes satisfies a maximum value of the silhouette coefficient.

5. The method according to claim 2, wherein the step (3-3) comprises:
   step (3-3a): splitting the comment statements by the StanfordCoreNLP Natural Language Processing Toolkit and marking the part of speech of the words;
   step (3-3b): extracting all nouns in a sentence and removing product names;
   step (3-3c): pre-training the TF-IDF model based on the data set, and deleting nouns with a TF-IDF value lower than a TF-IDF value threshold or a word frequency higher than a word frequency threshold;
   step (3-3d): calculating an L2 distance between the noun screened in the sentence and the attribute words in the product attributes based on the pre-trained Word2Vec model, and taking a product attribute with a shortest distance sum as a product attribute corresponding to the sentence; and
   step (3-3e): merging sentences with a same product attribute, so as to segment a general comment statement into vectors comprising product attribute statements.

6. The method according to claim 5, wherein the calculating method in the step (3-3d) comprises: firstly, calculating a sum $A_{ij}$ of L2 distances between a noun i and all attribute words in a product attribute j, then further adding the sum $A_{ij}$ of distances of all nouns corresponding to a product attribute j to obtain a distance value $A_j$ corresponding to each product attribute j, and taking a product attribute with a shortest distance value $A_j$ as the product attribute corresponding to the sentence.

7. The method according to claim 1, wherein the step (5) comprises:
   step (5a): obtaining a sentiment probability corresponding to a user id, a product id and an attribute statement vector of each comment; wherein a sentiment probability $P_{ij}^t$ corresponding to each attribute statement is:

$$P_{ij}^t = (P_{good}, P_{medium}, P_{poor})$$

where i is the user id, j is the product id, and t is the product attribute, $P_{good} + P_{medium} + P_{poor} = 1$;
   step (5b): calculating a confusion matrix R, wherein $R(x_s, x_y)$ represents a probability that an attribute statement evaluations$_{ij}^t$ is $x_s$ when an objective product attribute evaluation $y_j^t$ is $x_y$:

$$R(x_s, x_y) = \begin{cases} P_{ij}^{t \times s} & x_s = x_y \\ \dfrac{1 - P_{ii}^{t \times s}}{2} & x_s \neq x_y \end{cases}$$

where $x_y$, $x_s \in$ (good, medium, poor);
   step (5c): calculating the E step in the EM algorithm: calculating a conditional probability of the objective product attribute evaluation $$p(s_{ij}^t \mid y_j^t, \mu_i, \tau_j^t, R) = \begin{cases} \dfrac{1}{1 + e^{-\mu_i \tau_j^t}} R(s_{ij}^t, y_j^t) & s_{ij}^t = y_j^t \\ \dfrac{1 - \dfrac{1}{1 + e^{-\mu_i \tau_j^t}} R(s_{ij}^t, y_j^t)}{T - 1} & s_{ij}^t \neq y_j^t \end{cases}$$

$$p(y_j^t \mid S, \mu, \tau, R) = p(y_j^t \mid s_j^t, \mu, \tau_j^t, R) \propto$$

-continued $$p(y_j^t \mid \mu, \tau_j^t)p(s_j^t \mid y_j^t, \mu, \tau_j^t, R) \propto p(y_j^t)\prod_i p(s_{ij}^t \mid y_j^t, \mu_i, \tau_j^t, R)$$

where $p(s_{ij}^t \mid y_j^t, \mu_i, \tau_j^t, R)$ represents the conditional probability that the attribute statement evaluation is $s_{ij}^t$ when the objective product attribute evaluation $y_j^t$, a user's harshness $\mu_i$, a product evaluation difficulty $\tau_j^t$ and the confusion matrix R are given; $p(y_j^t \mid S, \mu, \tau, R)$ represents the conditional probability of the objective product attribute evaluation $y_j^t$ when an attribute statement evaluation set S, a users' harshness $\mu$, a product evaluation difficulty $\tau$ and the confusion matrix R are given; T is a number of possible results for product evaluation;

step (5d): calculating the M step in the EM algorithm: solving the users' harshness $\mu$ and the product evaluation difficulty $\tau$ for maximizing the Q function:

$$Q(\mu, \tau, R) = E[\ln p(S, Y \mid \mu, \tau, R)]$$

$$= E\left[\ln \prod_{jt}\left(p(y_j^t)\prod_i p(s_{ij}^t \mid y_j^t, \mu_i, \tau_j^t, R)\right)\right]$$

$$= \sum_{jt} E[\ln p(y_j^t)] + \sum_{ijt} E[\ln p(s_{ij}^t \mid y_j^t, \mu_i, \tau_j^t, R)]$$

where Y is an objective product attribute evaluation set, and S is an attribute statement evaluation set; and step (5e): optimizing the Q function by the SLSQP gradient descent optimization algorithm, and stopping when the maximum number of cycles is reached or a difference between Q functions of two adjacent iterations is less than a threshold value, so as to obtain the users' harshness $\mu$, the product evaluation difficulty $\tau$ and the result Y of the product attribute evaluation set.

* * * * *